United States Patent
Alimi et al.

(10) Patent No.: US 6,741,576 B1
(45) Date of Patent: May 25, 2004

(54) RE-ASSIGNMENT METHOD OF RE-ASSIGNING A CONNECTION IDENTIFIER IN A NETWORK OPERATING IN THE CONNECTION MODE

(75) Inventors: Raphaël Alimi, Paris (FR); Guillène Teboul, Santa Clara, CA (US); Souad Damien, Palaiseau (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/333,629

(22) Filed: Jun. 15, 1999

(30) Foreign Application Priority Data

Jun. 23, 1998  (FR) .............................. 98 07917

(51) Int. Cl.[7] .............................................. H04Q 7/00
(52) U.S. Cl. ..................................... 370/329; 370/395.3
(58) Field of Search ............................... 370/395, 322, 370/329, 431, 395.3, 395.2, 395.41, 395.42, 443, 450, 462; 709/223, 227, 228, 229, 225

(56) References Cited

U.S. PATENT DOCUMENTS 5,086,507 A  *  2/1992  Mela ......................... 455/34
5,339,318 A       8/1994  Tanaka et al. .......... 370/110.1
5,483,525 A       1/1996  Song et al. ............... 370/60
5,734,589 A  *  3/1998  Kostreski et al. ........ 364/514

OTHER PUBLICATIONS

"A Tutorial on the Digital Audio–Visual Council (Davic) Standardisation Activity", A. Donnelly and C. Smythe, Electronics and Communication Engineering Journal, Feb. 1997, pp. 46–56.

* cited by examiner

Primary Examiner—Wellington Chin
Assistant Examiner—Brenda Pham
(74) Attorney, Agent, or Firm—Michael E. Belk

(57) ABSTRACT

The invention is applied to communication networks in the connection mode, for example, cable TV distribution networks which utilize the ATM standard (standards DAVIC, IEEE802.14).

In such systems, the network head-end assigns a connection identifier to each user station that requests a connection. As the number of connection identifiers likely to be assigned simultaneously is limited, the invention consists of permitting the re-assignment of the identifiers of the user stations which are connected to the network, but which are inactive (that is to say, which have not made use of the network for a certain period of time). When a station whose identifier has been re-assigned starts transmitting again, the network head-end sets up a new connection to this station. These operations are transparent to the user.

8 Claims, 2 Drawing Sheets

RE-ASSIGNMENT METHOD OF RE-ASSIGNING A CONNECTION IDENTIFIER IN A NETWORK OPERATING IN THE CONNECTION MODE

FIELD OF THE INVENTION

The invention relates to a communication network in the connection mode, which comprises at least network equipment and user stations, said network equipment having assignment means for assigning at least one connection identifier to a user station in response to a request for a connection from said user station.

The invention also relates to network equipment intended to be used in such a network and an assignment method of assigning a connection identifier intended to be used in such network equipment.

The invention has important applications, notably in the field of cable television distribution networks, for example, in the networks in conformity with the standards DAVIC or IEEE802.14.

BACKGROUND OF THE INVENTION

U.S. Pat. No. 5,483,525 describes an ATM (Asynchronous Transfer Mode) communication network which comprises at least a network unit in charge of assigning identifiers VPI/VCI (Virtual Path Identifier and Virtual Channel Identifier) to each user who requests the set up of a connection. The assigned identifiers are chosen from a list of available identifiers.

The problem posed is that the number of identifiers that can be assigned is restricted. When no identifier is available any longer, it is no longer possible to set up a connection. The invention notably has for its object to remedy this drawback.

SUMMARY OF THE INVENTION

For this purpose, a network and equipment according to the invention and as described in the opening paragraph are characterized in that said assignment means comprise re-assignment means for re-assigning the connection identifier of the stations that have not used the network for a certain period of time, which are called inactive stations.

Similarly, an assignment method according to the invention of assigning at least one connection identifier to a user station of a communication network in the connection mode in response to a request for a connection from said station is characterized, in that it includes a re-assignment option of re-assigning the connection identifier of the stations that have not used the network for a certain period of time, which are called inactive stations.

The invention makes use of the fact that statistically, in the case of a cable television network, only 30% of the user stations that are connected to the network transmit data simultaneously.

BRIEF DESCRIPTION OF THE DRAWINGS

These and other aspects of the invention are apparent from and will be elucidated, by way of non-limitative example, with reference to the embodiment described hereinafter.

In the drawings.

DESCRIPTION OF PREFERRED EMBODIMENT

Figure 1:
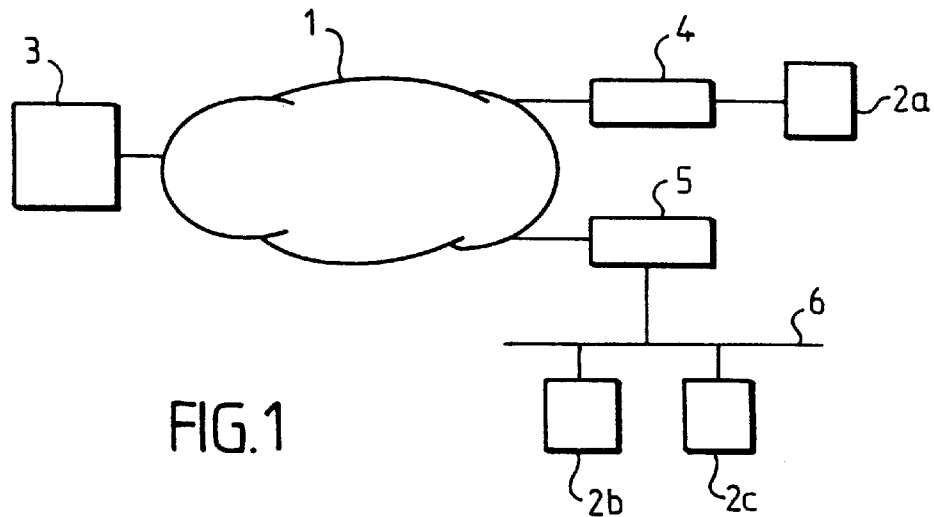
FIG. 1 represents an example of a network according to the invention.

In FIG. 1 is shown by way of example a cable television network 1 comprising user stations 2a, 2b, 2c, . . . and a network head-end 3. This network is a tree-like network whose highest node is formed by the network head-end. The user stations form the leaves of the tree-like network. They are connected to the network head-end by one or various intermediate nodes having a function of repeater.

Each user station is connected to the cable network 1 via a modem called cable modem. The cable network of FIG. 1 comprises two cable modems 4 and 5. The modem 4 connects the user station 2a to the cable network 1. The modem 5 is connected to a local area network 6 of the Ethernet type, for example, for connecting all the user stations of the local area network 6 to the cable network 1. In FIG. 1, the local area network 6 includes two user stations 2b and 2c.

The network 1 is an ATM network. The general principles of ATM are, for example, defined in chapter 3.2 of the publication by Martin de Prycker entitled "Asynchronous Transfer Mode: solution for broadband ISDN", published in 1991 by Ellis Horwood Ltd., Great Britain. Let us simply recall here that ATM is a transfer-mode-oriented connection, that is to say, that a connection between the network head-end and the user station is to be set up before the station can transmit ATM cells onto the network. The setup procedure for such a connection is defined by Recommendation Q2931 of the ATM forum. The procedure is effected at the request of the user station that wishes to be connected to the network, while a logical path reserved for this purpose is used, and the procedure notably comprises an assignment step of assigning an identifier VCI and/or an identifier VPI to the user station, and an assignment step of assigning the resources necessary for the communication.

The user stations have a local communication protocol. In the example that will be described, this is the IP (Internet Protocol) protocol. This means that the stations communicate with the modem to which they are connected by using packets of the IP format, and that the modems carry out an encapsulation operation in the ATM cells of the IP packets they receive coming from the stations, so as to transmit them onto the cable network. Conversely, they carry out a de-encapsulation operation of the ATM cells they receive coming from the cable network 1, so as to reconstitute the IP packets to be transmitted to the user stations.

An IP address is dynamically assigned to each station when it is started. In the case where a modem connects various user stations to the cable network, two addressing methods of the user stations may be considered: according to a first method, each user station has a unique IP address on the cable assembly 1, according to a second method, a local IP address that is not necessarily unique on the network assembly is assigned to the user stations. With this second method, the modem ensures a local address conversion by substituting, on transmission, its own IP address for the IP address of the transmitted packets. On reception, the modem finds the IP address of the destination station back on the basis of the logical channel identifier of the received cells.

When the first method is used, a unique identifier VPI/VCI is thus associated to an IP address that is the IP address of the user station. When the second method is used, one associates as many identifiers VPI/VCI to the same IP address, which is that of the modem, as there are stations connected to the cable network on the local area network served by said modem.

Now there will be described an example of an assignment method of a connection identifier according to the invention. Such a method enables to particularly re-assign identifiers that have already been assigned to user stations when these stations are inactive. For this purpose, the network head-end has three tables 10, 20 and 30, which have the following functions:

- table 10 is a table that contains all the identifiers controlled by the network head-end and, for each of them, a Boolean availability indicator $A_i$,
- table 20 is a table that contains the indications relating to each current connection $C_i$, particularly the logic address $IP_i$ associated to the connection $C_i$ (as this has been explained above, this may be either the IP address of the user station i, or the IP address of the modem to which the user station i is connected), the identifier $I_i$ assigned to the station i, and a counter $T_i$ which is assigned to the station i and which is used for checking the activity of the station i. This counter indicates the time that has elapsed since the most recent use of the network by the station i (the counter $T_i$ is re-initialized each time the station transmits or receives data). When the counter exceeds a certain threshold MAX, the station is considered inactive.
- table 30 is a table that contains the address $IP_i$ and the identifier $I_i$ for the user stations i whose connections $C_i$ have been released.

When the network head-end re-assigns the identifier $I_i$ of an inactive station i to a station j which makes a request for a connection, it writes the new connection $C_j$ in the table 20 of the current connections, and it transfers the connection $C_i$ in the table 30 of the released connections.

When a station i has thus been disconnected in favor of station j, the problem posed is the following: the network head-end may receive cells carrying the identifier $I_i$ and intended for either the station j, or the station i, from other stations of the network. While running through the table 30, the network head-end is thus to systematically check whether the identifier of the logical path contained in the cells it receives is a re-assigned identifier. In that case, while comparing the IP addresses, it checks whether the destination station of the packets IP contained in the received cells is the one that is written in the table 30 for said identifier. In the opposite case, a new connection to the disconnected station is to be set up again for transmitting thereto the IP packets addressed to that station: the station is thus removed from table 30 and the new connection is written in the table 20.

Furthermore, before it is able to start transmitting data again, a station that has been disconnected is to be reconnected. This reconnection procedure is controlled in a conventional manner by the station, at the level MAC (the MAC layer is the physical access sub-layer of the 7-layer OSI model.) It is thus transparent to the user of the station.

Figure 2:
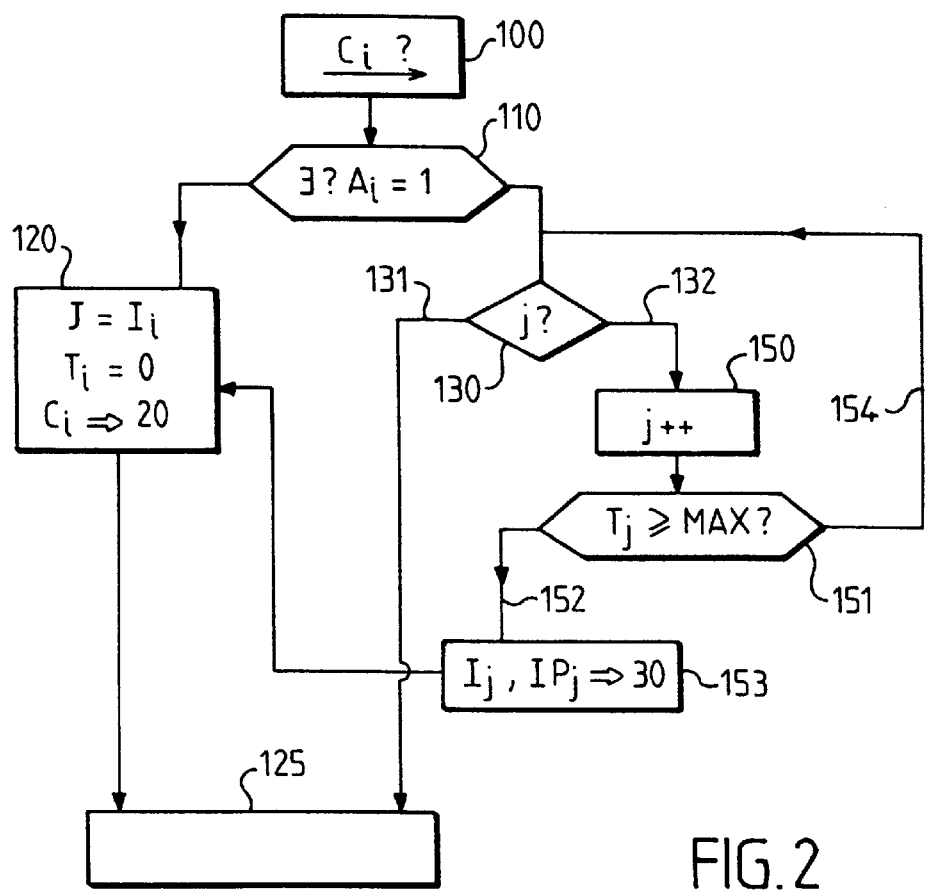
FIG. 2 represents an example of an assignment method of a connection identifier according to the invention.

An example of an assignment method of assigning a connection identifier according to the invention is described in FIG. 2.

In box 100, the network head-end receives a request to set up a connection (this may be either a request to set up a connection coming from a user station i, or a request to set up a connection featured by the network head-end itself for setting up a new connection to a station whose connection has been released). The network head-end thus searches for an available identifier (box 110) in table 10.

If an available identifier J is found, the network head-end performs the following operations in box 120: assignment of this available identifier to the station $i(I_i=J)$, initialization of a counter $T_i$, and writing of the data relating to the connection $C_i(I_i, IP_i, T_i)$ in the table 20. Thereafter, the operation is terminated in box 125.

If not found, the network head-end starts a search procedure for a possible inactive station by running through table 20. Therefore, the network head-end performs the following operations:

- in box 130 it checks whether the table 20 has been run through completely. If the table 20 has been run through completely (arrow 131), and if no identifier has been found, the procedure to set up a connection is terminated in box 125 (the connection is not set up).
- If the table 20 has not been run through completely (arrow 132), the network head-end continues to run through the table to search for a connection that may be released (box 150). Therefore, for each connection $C_j$ written in the table 20, the network head-end tests the value of the counter $T_j$ (box 151).
- If $T_j$ is higher than a predefined threshold MAX (arrow 152), the station $S_j$ is considered inactive. The connection $C_j$ is released: it is removed from table 20 and the identifier $I_j$ and the address $IP_j$ relating to the station j are written in the table 30 (box 153). Thereafter, the identifier $I_j$ is assigned to the station i and the new connection is written in the table 20 (box 120).
- If $T_j$ is lower than the threshold MAX (arrow 154), the operation is resumed in box 130.

Figure 3:
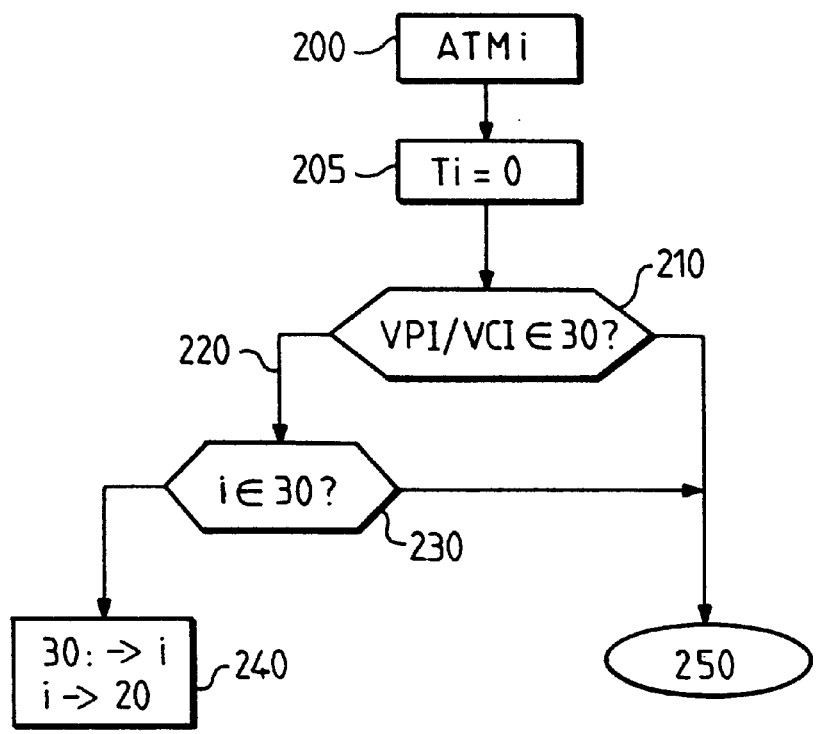
FIG. 3 is an example of a method of connection control by the network head-end.

In FIG. 3 is represented an example of a method of connection control by the network head-end:

- in box 200, the network head-end receives a cell $ATM_i$ that has a station i for its destination.
- in box 205 it resets the counter $T_i$ that is associated to this station i to zero.
- in box 210 it extracts from this cell the logical path identifier VPI/VCI and checks whether this is a re-assigned identifier by running through the table 30.
- in that case (arrow 220), the network head-end is to check whether the station i is the station that has been disconnected.

This check is made in box 230.

- in the opposite case (arrow 240), the operation is terminated in box 250.
- if the result of the check made in box 230 is that station i is the station that has been disconnected, a new connection to the station i is set up in box 240. This new connection is written in the table 20 and the station i is removed from the table 30.
- if not, the operation is terminated in box 250.

Figure 4:
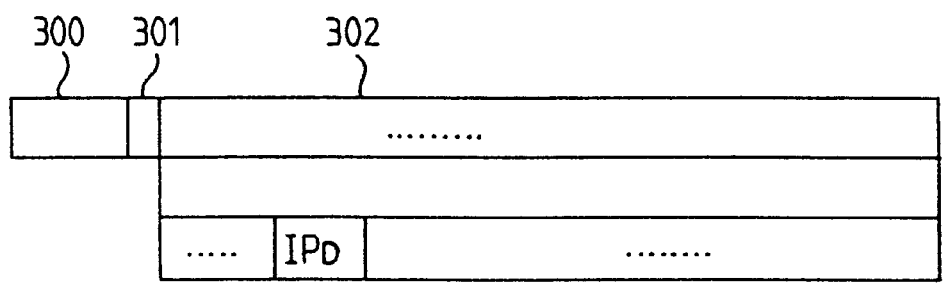
FIG. 4 is a representation of an ATM cell.

The operations to be carried out in step 230 will now be described in detail while reference is made to FIG. 4. In the FIG. 4 is notably represented an ATM cell that carries reference 300. This cell 300 comprises a header 301 of 4 octets which carry the information necessary for routing the ATM cell in the network (notably the identifier of the logical path VPI/VCI), a header protection field 302 for protecting this header against transmission errors, which contains 1 octet, and a data field 303 containing 48 octets which transports the user data and the associated protocol elements. In the case where the ATM cells are used for transporting IP packets, each IP packet is subdivided to be transmitted in various ATM cells. The first part of an IP packet is contained in the information field of a first ATM cell, the following parts are contained in the information fields of the following cells. The first ATM cell thus contains the header of the packet IP. This header notably contains the source address IP (denoted $IP_S$) and the destination address IP (denoted $IP_D$) of the packet IP. The destination address IP occupies the octets 17 to 20 of the header IP. In box 230 the octets that are used for positioning the destination address $IP_D$ are thus extracted from the ATM cell in box 230 (that is to say, the octets 22 to 25 of the ATM cell) and they are compared with the address written in the table 30.

It will be noted that the invention is certainly not restricted to the ATM and IP protocols: the invention may be applied to any network operating in the connection mode and to any local communication protocol. Moreover, in practice, the three tables 10, 20 and 30 are advantageously stored in the form of a unique record for each identifier, which record combines the following data: the identifier $I_i$, its availability indicator $A_i$, the address $IP_i$ and the counter $T_i$ relating to the connection $C_i$ and a Boolean indicator $R_i$ indicating whether the identifier $I_i$ has been re-assigned.

What is claimed is:

1. A communication network in the connection mode, which comprises at least network equipment and user stations, said network equipment having assignment means for assigning at least one connection identifier to a user station in response to a request for a connection from said user station, wherein said assignment means comprises re-assignment means for retaining an operative connection by re-assigning the connection identifier of the stations that have not used the network for a certain period of time, which are called inactive stations.

2. A communication network in the connection mode, which comprises at least network equipment and user stations, said network equipment having assignment means for assigning at least one connection identifier to a user station in response to a request for a connection from said user station, wherein said assignment means comprises re-assignment means for re-assigning the connection identifier of the stations that have not used the network for a certain period of time, which are called inactive stations and said assignment means comprise storage means for storing inactive stations, called disconnected stations, whose identifier has been re-assigned and assignment means for assigning a new connection identifier to a disconnected station when the latter again starts using the network.

3. A network as claimed in claim 1, characterized in that this is a cable television network.

4. A network as claimed in claim 2, characterized in that this is a cable television network.

5. An assignment method of assigning at least one connection identifier to a user station of a communication network in the connection mode, in response to a request for a connection from said station, wherein the method includes a re-assignment option of retaining an operative connection by re-assigning the connection identifier of the stations that have not used the network for a certain period of time, which are called inactive stations.

6. An assignment method of assigning at least one connection identifier to a user station of a communication network in the connection mode, in response to a request for a connection from said station, wherein the method includes a re-assignment option of re-assigning the connection identifier of the stations that have not used the network for a certain period of time, which are called inactive stations and further comprises for implementing the storing of inactive stations called disconnected stations for which the identifier has been re-assigned, and assigning a new connection identifier to a disconnected station when the latter again starts using the network.

7. Network equipment of a communication network in the connection mode, which comprises user stations, said network equipment having assignment means for assigning at least one connection identifier to a user station in response to a request for a connection from said user station, wherein said assignment means include means for retaining an operative connection by re-assigning the connection identifier of the stations that have not used the network for a certain period of time, which are called inactive stations.

8. Network equipment of a communication network in the connection mode, which comprises user stations, said network equipment having assignment means for assigning at least one connection identifier to a user station in response to a request for a connection from said user station, wherein said assignment means include means for re-assigning the connection identifier of the stations that have not used the network for a certain period of time, which are called inactive stations said assignment means comprise storage means for storing inactive stations called disconnected stations, whose identifier has been re-assigned and assignment means for assigning a new connection identifier to a disconnected station when this disconnected station starts using the network again.

\* \* \* \* \*